(12) United States Patent
Gonzalez et al.

(10) Patent No.: US 10,407,879 B2
(45) Date of Patent: Sep. 10, 2019

(54) SYSTEM AND METHOD FOR REMOTE WORK IMPLEMENT ANGULAR POSITION DISPLAY

(71) Applicant: Deere & Company, Moline, IL (US)

(72) Inventors: Juan Daniel Gonzalez, Saltillo (MX); Ignacio Alonso Martinez, Ramos Arizpe (MX)

(73) Assignee: DEERE & COMPANY, Moline, IL (US)

( * ) Notice: Subject to any disclaimer, the term of this patent is extended or adjusted under 35 U.S.C. 154(b) by 182 days.

(21) Appl. No.: 15/427,777

(22) Filed: Feb. 8, 2017

(65) Prior Publication Data
US 2018/0223504 A1    Aug. 9, 2018

(51) Int. Cl.
*E02F 3/43* (2006.01)
*E02F 9/20* (2006.01)
(Continued)

(52) U.S. Cl.
CPC ............ *E02F 9/264* (2013.01); *A01B 59/064* (2013.01); *A01B 76/00* (2013.01); *E02F 3/431* (2013.01);
(Continued)

(58) Field of Classification Search
CPC .. A01B 76/00; E02F 3/34; E02F 3/431; E02F 3/627; E02F 9/205; E02F 9/264; G05D 1/0038; G05D 2201/0202; G06F 3/04847
See application file for complete search history.

(56) References Cited

U.S. PATENT DOCUMENTS 4,266,909 A * 5/1981 Langenfeld ............. E02F 3/433
                                                  414/700
4,391,563 A    7/1983 Vietor
(Continued)

FOREIGN PATENT DOCUMENTS

JP    H04 136327 A    5/1992
JP       6002873 B1   10/2016

OTHER PUBLICATIONS

Deere & Company, Pending Utility U.S. Appl. No. 15/299,129, "Work Vehicle Gyroscopic Boom Control System and Method", filed Oct. 20, 2016.
(Continued)

*Primary Examiner* — Jerrah Edwards
(74) *Attorney, Agent, or Firm* — Klintworth & Rozenblat IP LLP

(57) ABSTRACT

A remote angular position display system and method are disclosed. The angular position of a work implement of a work vehicle is displayed (e.g., textually, numerically or graphically) on a display associated with a portable device. The angular position is observed by a sensor coupled to the work implement or the work vehicle. The method includes receiving, by a processor of the portable device, one or more signals from the sensor indicative of an angular position value, and determining, by the processor, a condition associated with the work implement based on the angular position. The method includes outputting, by the processor, an interface for rendering on the display associated with the portable device that indicates the angular position and the determined condition associated with the work implement of the work vehicle.

17 Claims, 8 Drawing Sheets

(51) Int. Cl.
*E02F 9/26* (2006.01)
*G05D 1/00* (2006.01)
*A01B 76/00* (2006.01)
*E02F 3/627* (2006.01)
*A01B 59/06* (2006.01)
*E02F 3/34* (2006.01)
*G06F 3/0484* (2013.01)

(52) U.S. Cl.
CPC ............. *E02F 3/627* (2013.01); *E02F 9/205* (2013.01); *G05D 1/0038* (2013.01); *E02F 3/34* (2013.01); *G05D 2201/0202* (2013.01); *G06F 3/04847* (2013.01)

(56) References Cited

U.S. PATENT DOCUMENTS

| | | | |
|---|---|---|---|
| 7,831,362 B2 * | 11/2010 | Ishibashi | E02F 9/2045 |
| | | | 37/341 |
| 8,660,758 B2 * | 2/2014 | Janardhan | E02F 9/264 |
| | | | 177/139 |
| 2002/0077737 A1 | 6/2002 | Kalafut et al. | |
| 2003/0147727 A1 | 8/2003 | Fujishima | |
| 2005/0080559 A1 * | 4/2005 | Ishibashi | E02F 9/2045 |
| | | | 701/50 |
| 2009/0143896 A1 * | 6/2009 | Janardhan | B25J 9/1638 |
| | | | 700/213 |
| 2013/0197743 A1 | 8/2013 | Lindskov | |
| 2014/0099178 A1 | 4/2014 | Nomura et al. | |
| 2014/0100712 A1 | 4/2014 | Nomura et al. | |
| 2014/0168009 A1 | 6/2014 | Peake | |
| 2017/0254050 A1 * | 9/2017 | Wright | H04N 7/181 |

OTHER PUBLICATIONS

Extended European Search Report issued for EP 18 15 5626 dated Sep. 19, 2018, 13 pages.

* cited by examiner

SYSTEM AND METHOD FOR REMOTE WORK IMPLEMENT ANGULAR POSITION DISPLAY

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicles and the remote display of an angular position value observed by a sensor associated with the work vehicle on a portable device.

BACKGROUND OF THE DISCLOSURE

In the agriculture, construction and forestry industries, various work machines, such as loaders, may be utilized in lifting and moving various materials. In certain examples, a loader may include a bucket pivotally coupled by a boom to a frame. One or more hydraulic cylinders are coupled to the boom and/or the bucket to move the bucket between positions relative to the frame.

Generally, in order to lift and move various materials, the bucket is moved in various positions relative to the frame. In certain instances, due to the material to be lifted and/or moved, the operator of the loader may be unable to determine an orientation of the bucket relative to the frame. In this instance, the operator may need to exit the loader to observe the position of the bucket relative to the frame to determine whether the bucket is in a proper position to lift and/or move the materials. This reduces the efficiency of the loader operation.

SUMMARY OF THE DISCLOSURE

The disclosure provides a system and method for remotely displaying an angular position of a work implement, such as a bucket, on a portable device carried by an operator of a work vehicle, such as a loader, to increase the efficiency of the loading operation.

In one aspect the disclosure provides a method for displaying an angular position of a work implement of a work vehicle on a display associated with a portable device. The angular position is observed by a sensor coupled to the work implement or the work vehicle. The method includes receiving, by a processor of the portable device, one or more signals from the sensor indicative of an angular position value, and determining, by the processor, a condition associated with the work implement based on the angular position value. The method includes outputting, by the processor, an interface for rendering on the display associated with the portable device that indicates the angular position value and the determined condition associated with the work implement of the work vehicle.

In another aspect the disclosure provides a system for displaying an angular position of a work implement of a work vehicle on a display associated with a portable device. The angular position is observed by a sensor coupled to the work implement or the work vehicle. The system includes a source of an angular position value observed by the sensor. The system also includes a processor of the portable device that determines a condition associated with the work implement based on the angular position value and outputs an interface for rendering on the display associated with the portable device that indicates the angular position value and the determined condition associated with the work implement of the work vehicle.

In yet another aspect the disclosure provides a system for displaying an angular position of a work implement of a work vehicle on a display associated with a portable device. The angular position is observed by a sensor removably coupled to the work implement or the work vehicle. The system includes the sensor that observes the work implement and generates one or more signals indicative of an angular position value based on the observation. The system also includes a processor of the portable device that retrieves at least a first predefined value and a second predefined value from a datastore, and compares the angular position value and the first predefined value to determine a first condition associated with the work implement. The processor also compares the angular position value and the second predefined value to determine a second condition associated with the work implement, and outputs an interface for rendering on the display associated with the portable device that indicates the angular position value and the determined one of the first condition or the second condition associated with the work implement of the work vehicle.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
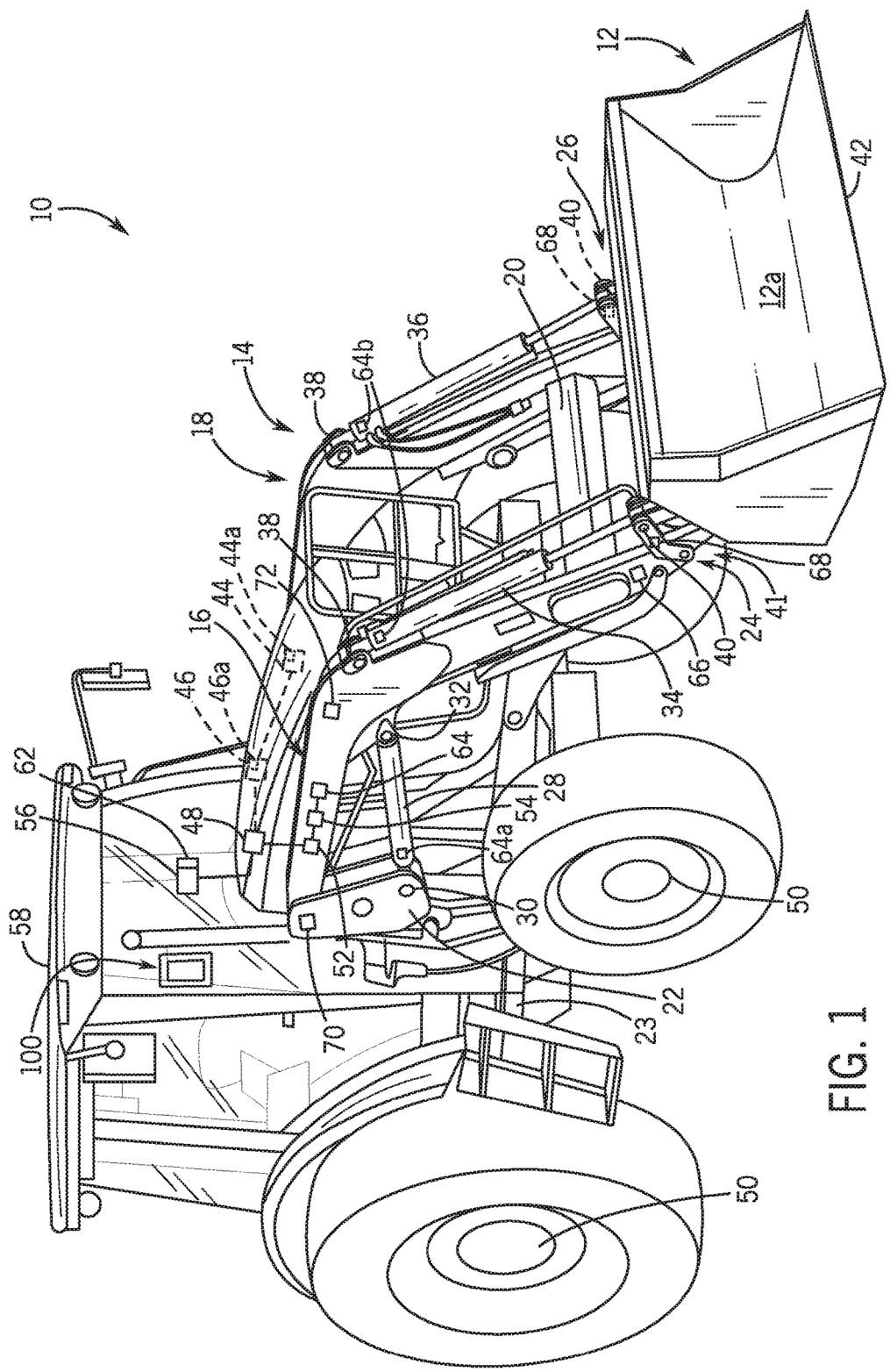
FIG. 1 is a perspective view of an example work vehicle in the form of a loader in which the disclosed remote angular position display system and method may be used.

The following describes one or more example embodiments of the disclosed system and method, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the loader described herein is merely one example embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Generally, a work implement may be supported with respect to a work vehicle (or other work machine) by a boom assembly and the boom assembly may be moved by various actuators in order to accomplish tasks with the end effector. Discussion herein may sometimes focus on the example application of moving an implement configured as a scoop or bucket for a loader, with actuators for moving the bucket generally configured as hydraulic cylinders. In other applications, other configurations are also possible. In some embodiments, for example, claws, grapples, forks, or other devices may also be configured as movable implements. Likewise, work vehicles in some embodiments may be configured as excavators or other diggers, as forwarders, as skidders, or similar machines, or in various other ways.

The following describes one or more example implementations of the disclosed system for improving an efficiency of a loading operation by displaying remotely an angular position of an implement configured as a bucket, as shown in the accompanying figures of the drawings described briefly above. Generally, the disclosed systems (and work vehicles in which they are implemented) provide for improved efficiency in a loading operation as compared to conventional systems by utilizing a display of a portable device to indicate the angular position and condition of the implement (e.g., graphically, textually or numerically). By utilizing the display of a portable device, an operator can easily view the angular position and condition of the implement on the portable device without leaving a cab of the work vehicle, thereby increasing the efficiency of operation of the work vehicle.

Initially, a sensor, such as a removably or fixedly mountable angular position sensor, may be coupled to either the work vehicle or the implement. In the example of the work vehicle as a loader and the implement as a bucket, the angular position sensor is coupled to the carrier of the bucket. The angular position sensor is in wireless or wired communication with the portable device, such that the portable device receives the one or more sensor signals or sensor data from the angular position sensor. The portable device receives, or otherwise processes the sensor signals or sensor data to determine, an angular position value.

Generally, the disclosed remote angular position display system enables the operator to calibrate the system such that the operator may set one or more angular position values from which the system determines the condition. For example, the operator may set a first angular position as a first, level position, a second angular position as a second, roll back position and a third angular position as a third, dump position through the portable device. Based on the operator's calibration, the system outputs the display to indicate the condition based on the angular position of the bucket as observed by the sensor.

In one example, the system outputs a calibration interface, which instructs the user to calibrate the system. In this example, a first calibration prompt user interface includes instructions for moving the bucket to the first, level position. The operator may select a button or icon to indicate that the bucket has been moved to the first, level position. Based on the receipt of the user input, the system receives the sensor signals from the sensor and determines the angular position value. The system associates the angular position value with the first, level position and stores this as a first predefined value in a datastore. The system also outputs a second calibration prompt user interface includes instructions for moving the bucket to the second, roll back position. The operator may select a button or icon to indicate that the bucket has been moved to the second, roll back position. Based on the receipt of the user input, the system receives the sensor signals from the sensor and determines the angular position value. The system associates the angular position value with the second, roll back position and stores this as a second predefined value in a datastore. The system also outputs a third calibration prompt user interface includes instructions for moving the bucket to the third, dump position. The operator may select a button or icon to indicate that the bucket has been moved to the third, dump position. Based on the receipt of the user input, the system receives the sensor signals from the sensor and determines the angular position value. The system associates the angular position value with the third, dump position and stores this as a third predefined value in a datastore.

With the angular position values associated with positions of the bucket, the system receives the sensor signals during the operation of the loader. The system receives, or otherwise processes the sensor signals to determine, the angular position value. The system queries the datastore and retrieves the first, second and third predefined values. The system compares the angular position value to the first, second and third predefined values and determines the condition (i.e. load, level or dump) based on the comparison. The system outputs the angular position value and the determined condition to as an interface for display on the display of the portable device.

As noted above, the disclosed remote angular position display system may be utilized with regard to various machines or work vehicles with load buckets, including loaders and other machines for lifting and moving various materials. Referring to FIG. 1, in some embodiments, the disclosed remote angular position display system may be used with a loader 10 to display an angular position of a work implement, which in this example is a scoop or bucket 12 on a portable device 100. It will be understood that the configuration of the loader 10 is presented as an example only. In this regard, the disclosed remote angular position display system may be implemented with a front loader removably coupled to a work vehicle, such as a tractor.

In the embodiment depicted, the bucket 12 is pivotally mounted to a boom assembly 14. In this example, the boom assembly 14 includes a first boom 16 and a second boom 18, which are interconnected via a crossbeam 20 to operate in parallel. Each of the first boom 16 and the second boom 18 are coupled to a frame portion 22 of a frame 23 of the loader 10 at a first end, and are coupled at a second end to the bucket 12 via a respective one of a first pivot linkage 24 and a second pivot linkage 26.

One or more hydraulic cylinders 28 are mounted to the frame portion 22 and to the boom assembly 14, such that the hydraulic cylinders 28 may be driven or actuated in order to move or raise the boom assembly 14 relative to the loader 10. Generally, the boom assembly 14 includes two hydraulic cylinders 28, one coupled between the frame portion 22 and the first boom 16; and one coupled between the frame portion 22 and the second boom 18. It should be noted, however, that the loader 10 may have any number of hydraulic cylinders, such as one, three, etc. Each of the hydraulic cylinders 28 includes an end mounted to the frame portion 22 at a pin 30 and an end mounted to the respective one of the first boom 16 and the second boom 18 at a pin 32. Upon activation of the hydraulic cylinders 28, the boom assembly 14 may be moved between various positions to elevate the boom assembly 14, and thus, the bucket 12 relative to the frame 23 of the loader 10.

One or more hydraulic cylinders 34 are mounted to the first boom 16 and the first pivot linkage 24, and one or more hydraulic cylinders 36 are mounted to the second boom 18 and the second pivot linkage 26. Generally, the loader 10 includes a single hydraulic cylinder 34, 36 associated with a respective one of the first boom 16 and the second boom 18. In this example, each of the hydraulic cylinders 34, 36 includes an end mounted to the respective one of the first boom 16 and the second boom 18 at a pin 38 and an end mounted to the respective one of the first pivot linkage 24 and the second pivot linkage 26 at a pin 40. Upon activation of the hydraulic cylinders 34, 36, the bucket 12 may be moved between various positions to pivot the bucket 12 relative to the boom assembly 14.

Thus, in the embodiment depicted, the bucket 12 is pivotable about the boom assembly 14 by the one or more hydraulic cylinders 34, 36. In other configurations, other movements of a bucket or end effector may be possible. Further, in some embodiments, a different number or configuration of hydraulic cylinders or other actuators may be used. Thus, it will be understood that the configuration of the bucket 12 is presented as an example only. In this regard, a hoist boom (e.g. the boom assembly 14) may be generally viewed as a boom that is pivotally attached to a vehicle frame, and that is also pivotally attached to an end effector. Similarly, a pivoting linkage (e.g., the first and second pivoting linkages 24, 26) may be generally viewed as a pin or similar feature effecting pivotal attachment of a receptacle (e.g. bucket 12) to a vehicle frame. In this light, a tilt actuator (e.g., the hydraulic cylinders 34, 36) may be generally viewed as an actuator for pivoting a receptacle with respect to a hoist boom, and the hoist actuator (e.g. the hydraulic cylinders 28) may be generally viewed as an actuator for pivoting a hoist boom with respect to a vehicle frame.

Figure 2:
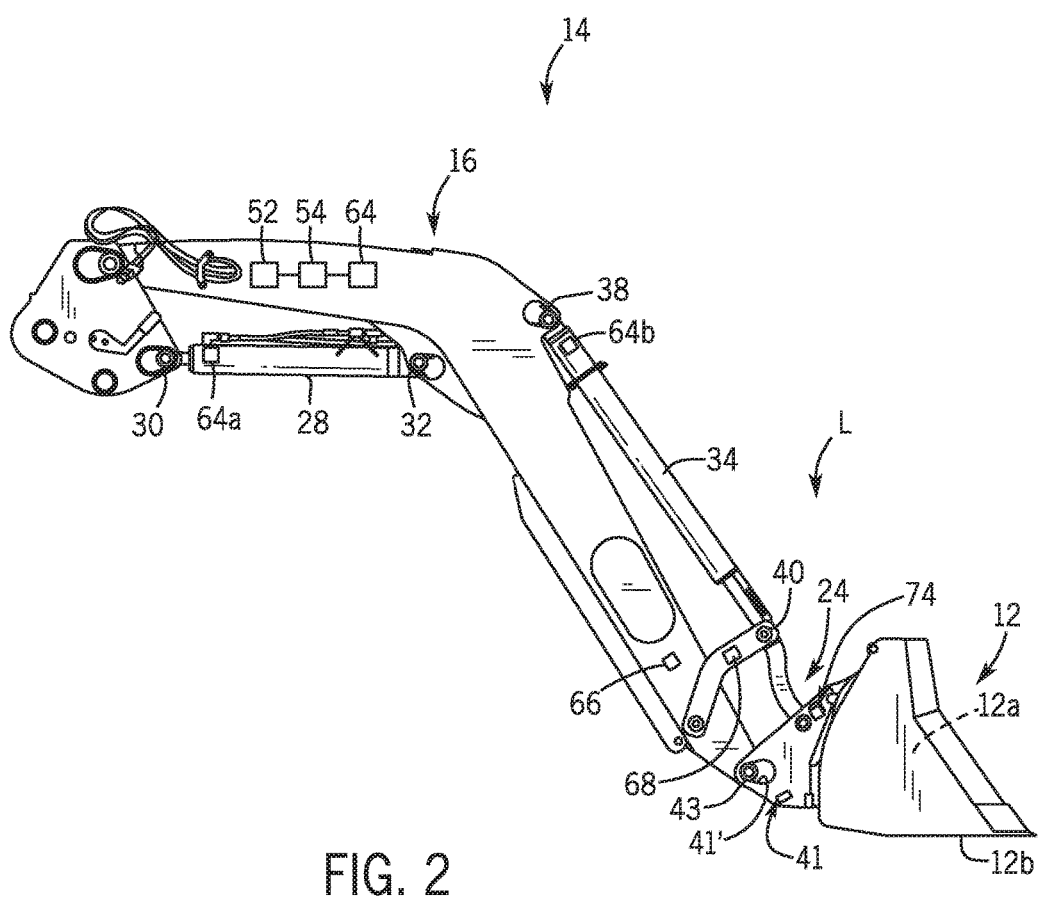
FIG. 2 is a side view of an example boom assembly and bucket of the work vehicle of FIG. 1.

With additional reference to FIG. 2, the bucket 12 includes a carrier 41. The carrier 41 couples the bucket 12 to the first boom 16 and the second boom 18, and thus, to the frame of the loader 10. The carrier 41 defines ones or more coupling bores 41'. The bucket 12 is coupled to the first pivot linkage 24 and the second pivot linkage 26 via one or more coupling pins 43 that are received through the one or more coupling bores 41'. The coupling pins 43 cooperate with the first pivot linkage 24 and the second pivot linkage 26 to enable the movement of the bucket 12 upon activation of the hydraulic cylinders 34, 36. As will be discussed further herein, the bucket 12 is movable upon activation of the hydraulic cylinders 34, 36 between a first, level position, a second, roll back position and a dump position, along with various positions in between. In the first, level position, the bucket 12 is capable of receiving various materials. In the second, roll back position, the bucket 12 is pivoted upward relative to the Earth's surface or ground by the actuation of the hydraulic cylinders 34, 36 such that the bucket 12 is loaded with and retains the various materials. In the third, dump position, the bucket 12 is pivoted downward relative to the Earth's surface or ground by the actuation of the hydraulic cylinders 34, 36 such that the various materials fall from the bucket 12 to substantially empty the bucket 12. The bucket 12 generally defines a receptacle 12a for the receipt of various materials, such as dirt, rocks, wet dirt, sand, hay, etc. In one example, the receptacle 12a may receive about 2.0 cubic yards of material to over about 5.0 cubic yards of material. The bucket 12 may include an elongated sidewall 12b on a bottommost edge to direct material into the receptacle 12a.

The loader 10 includes a source of propulsion, such as an engine 44. The engine 44 supplies power to a transmission 46. In one example, the engine 44 is an internal combustion engine, such as the diesel engine, that is controlled by an engine control module 44a.

The transmission 46 transfers the power from the engine 44 to a suitable driveline coupled to one or more driven wheels 50 (and tires) of the loader 10 to enable the loader 10 to move. As is known to one skilled in the art, the transmission 46 can include a suitable gear transmission, which can be operated in a variety of ranges containing one or more gears, including, but not limited to a park range, a neutral range, a reverse range, a drive range, a low range, etc. The transmission 46 may be controlled by a transmission control module 46a in communication with the controller 48.

The loader 10 also includes one or more pumps 52, which may be driven by the engine 44 of the loader 10. Flow from the pumps 52 may be routed through various control valves 54 and various conduits (e.g., flexible hoses) in order to drive the hydraulic cylinders 28, 34, 36. Flow from the pumps 52 may also power various other components of the loader 10. The flow from the pumps 52 may be controlled in various ways (e.g., through control of the various control valves 54), in order to cause movement of the hydraulic cylinders 28, 34, 36, and thus, the bucket 12 relative to the loader 10. In this way, for example, a movement of the boom assembly 14 and/or bucket 12 between various positions relative to the frame 23 of the loader 10 may be implemented by various control signals to the pumps 52, control valves 54, and so on.

Generally, the controller 48 (or multiple controllers) may be provided, for control of various aspects of the operation of the loader 10, in general. The controller 48 (or others) may be configured as a computing device with associated processor devices and memory architectures, as a hardwired computing circuit (or circuits), as a programmable circuit, as a hydraulic, electrical or electro-hydraulic controller, or otherwise. As such, the controller 48 may be configured to execute various computational and control functionality with respect to the loader 10 (or other machinery). In some embodiments, the controller 48 may be configured to receive input signals in various formats (e.g., as hydraulic signals, voltage signals, current signals, and so on), and to output command signals in various formats (e.g., as hydraulic signals, voltage signals, current signals, mechanical movements, and so on). In some embodiments, the controller 48 (or a portion thereof) may be configured as an assembly of hydraulic components (e.g., valves, flow lines, pistons and cylinders, and so on), such that control of various devices (e.g., pumps or motors) may be effected with, and based upon, hydraulic, mechanical, or other signals and movements.

The controller 48 may be in electronic, hydraulic, mechanical, or other communication with various other systems or devices of the loader 10 (or other machinery). For example, the controller 48 may be in electronic or hydraulic communication with various actuators, sensors, and other devices within (or outside of) the loader 10, including various devices associated with the pumps 52, control valves 54, and so on. The controller 48 may communicate with other systems or devices, such as the portable device 100, (including other controllers) in various known ways, including via a CAN bus (not shown) of the loader 10, via wireless or hydraulic communication means, or otherwise. An example location for the controller 48 is depicted in FIG. 1. It will be understood, however, that other locations are possible including other locations on the loader 10, or various remote locations.

In some embodiments, the controller 48 may be configured to receive input commands and to interface with an operator via a human-machine interface 56, which may be disposed inside a cab 58 of the loader 10 for easy access by the operator. The human-machine interface 56 may be configured in a variety of ways. In some embodiments, the human-machine interface 56 may include one or more joysticks, various switches or levers, one or more buttons, a touchscreen interface that may be overlaid on a display 62, a keyboard, a speaker, a microphone associated with a speech recognition system, or various other human-machine interface devices.

Various sensors may also be provided to observe various conditions associated with the loader 10. In some embodiments, various sensors 64 (e.g., pressure, flow or other sensors) may be disposed near the pumps 52 and control valves 54, or elsewhere on the loader 10. For example, sensors 64 may include one or more pressure sensors that observe a pressure within the hydraulic circuit, such as a pressure associated with at least one of the one or more hydraulic cylinders 28, 34, 36. The sensors 64 may also observe a pressure associated with the hydraulic pumps 52.

As a further example, one or more sensors 64*a* may be coupled to a respective one of the hydraulic cylinders 28 to observe a pressure within the hydraulic cylinders 28 and generate sensor signals based thereon. Further, one or more sensors 64*b* may be coupled to a respective one of the hydraulic cylinders 34, 36 to observe a pressure within the hydraulic cylinders 34, 36 and generate sensor signals based thereon.

In some embodiments, various sensors may be disposed near the bucket 12. For example, sensors 66 (e.g. inertial measurement sensors) may be coupled near the bucket 12 in order to observe or measure parameters including the acceleration of the boom assembly 14 near the bucket 12 and so on. Thus, the sensors 66 observe an acceleration of the boom assembly 14 near the bucket 12 and generate sensor signals thereon, which may indicate if the boom assembly 14 and/or bucket 12 is decelerating.

In some embodiments, various sensors 68 (e.g., angular position sensor) may be configured to detect the angular orientation of the bucket 12 relative to the boom assembly 14, or detect various other indicators of the current orientation or position of the bucket 12. Thus, the sensors 68 generally include bucket position sensors that indicate a position of the bucket 12 relative to the boom assembly 14. Other sensors may also (or alternatively) be used. For example, linear position or displacement sensors may be utilized in place of the rotary angular position sensors 68 to determine the length of the hydraulic cylinders 34, 36 relative to the boom assembly 14. In such a case, the detected linear position or displacement may provide alternative (or additional) indicators of the current position of the bucket 12.

Various sensors 70 (e.g., angular position sensor) may be configured to detect the angular orientation of the boom assembly 14 relative to the frame portion 22, or detect various other indicators of the current orientation or position of the boom assembly 14 relative to the frame 23 of the loader 10. Thus, the sensors 70 generally include boom position sensors that indicate a position of the boom assembly 14 relative to the frame 23 of the loader 10. Other sensors may also (or alternatively) be used. For example, a linear position or displacement sensors may be utilized in place of the angular position sensors 70 to determine the length of the hydraulic cylinders 28 relative to the frame portion 22. In such a case, the detected linear position or displacement may provide alternative (or additional) indicators of the current position of the boom assembly 14.

In one embodiment, with reference to FIG. 2, a removable sensor 74 is coupled to the loader 10. The removable sensor 74 is in communication with the portable device 100 to transmit sensor signals to the portable device 100 for display on the portable device 100. In the example of FIG. 2, the removable sensor 74 is removably coupled to the carrier 41 to observe an angular position of the bucket 12, generate sensor signals based on this observation and communicate these sensor signals to the portable device 100. It should be understood, however, that the removable sensor 74 may be mounted at any desired location on the loader 10 to observe any desired characteristic of the loader 10.

Figure 3:
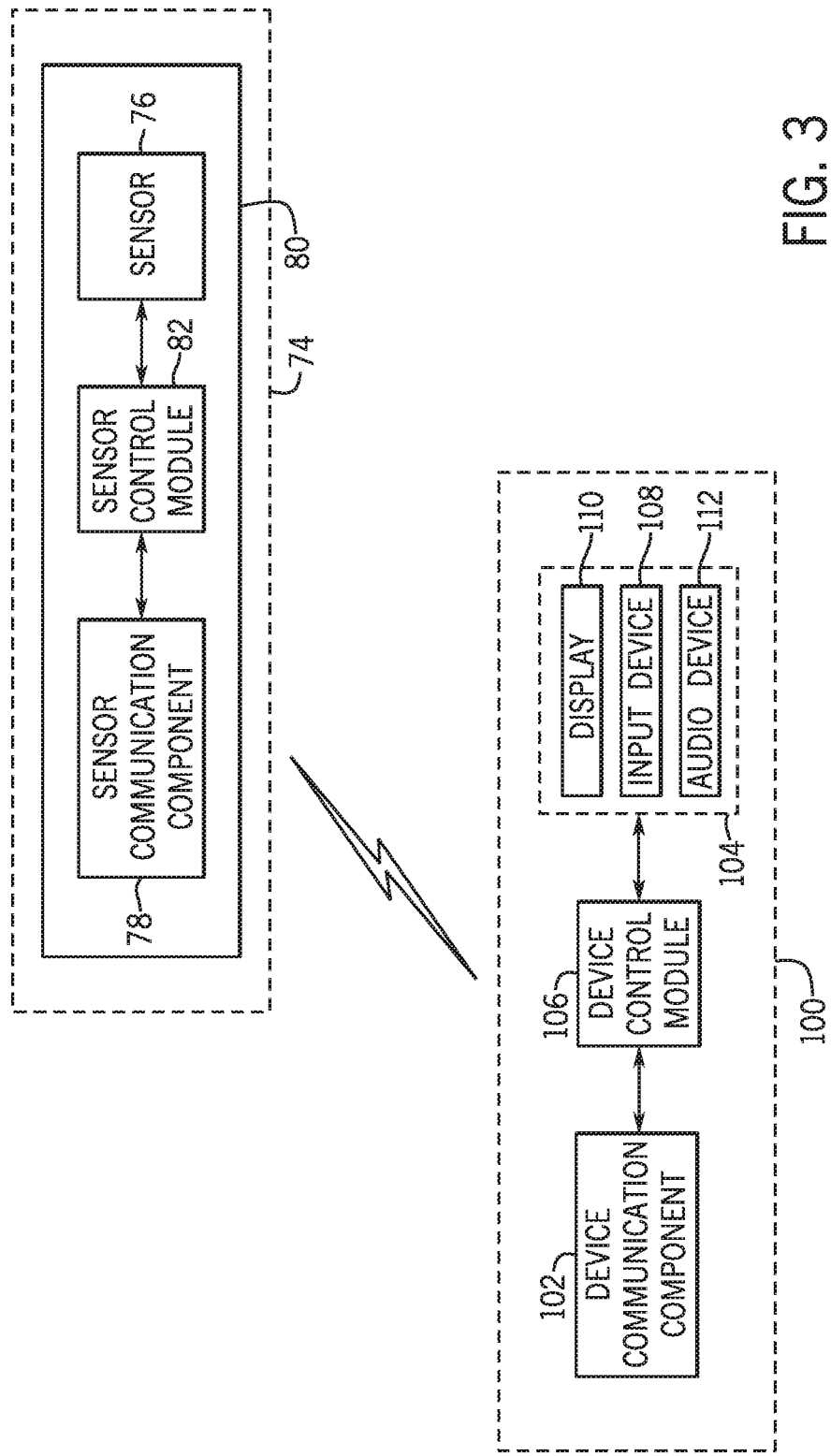
FIG. 3 is a functional block diagram of an example sensor and portable device in which the disclosed remote angular position display system and method may be used.

With reference to FIG. 3, the removable sensor 74 includes a sensor 76, a sensor communication component 78, a mounting structure 80 and a sensor control module 82. Generally, the sensor 76 observes an angular position of the bucket 12 relative to the Earth's surface or ground and generates one or more sensor signals based on the observation. In one example, the sensor 76 is a gyroscope, which observes the angular position of the bucket 12 relative to the Earth's surface or ground and generates one or more sensor signals based thereon. In other embodiments, the sensor 76 is an inertial measurement unit, which observes the angular position of the bucket 12 relative to the Earth's surface or ground and generates one or more sensor signals based thereon. In other embodiments, the sensor 76 is an angular position sensor, such as the sensor 68, which observes the angular position of the bucket 12 relative to the boom assembly 14 and generates one or more sensor signals based thereon.

The sensor communication component 78 comprises any suitable system for receiving data from and transmitting data, such as the sensor signals, to the portable device 100. For example, the sensor communication component 78 may include a radio configured to receive data transmitted by modulating a radio frequency (RF) signal from a remote station (not shown) as is well known to those skilled in the art. For example, the remote station (not shown) may be part of a cellular telephone network and the data may be transmitted according to the long-term evolution (LTE) standard. The sensor communication component 78 also transmits data to the remote station (not shown) to achieve bi-directional communications. However, other techniques for transmitting and receiving data may alternately be utilized. For example, the sensor communication component 78 may achieve bi-directional communications with the portable device 100 over Bluetooth or by utilizing a Wi-Fi standard, i.e., one or more of the 802.11 standards as defined by the Institute of Electrical and Electronics Engineers ("IEEE"), as is well known to those skilled in the art. In other embodiments, the sensor communication component 78 may be in wired communication with the portable device 100 via a suitable communication architecture. In still other embodiments, the sensor communication component 78 may be in communication with the controller 48, and the controller 48 may be in communication with the portable device 100 to transmit the sensor signals to the portable device 100.

The mounting structure 80 removably couples the removable sensor 74 to the carrier 41 of the loader 10. In one example, the removable sensor 74 is contained within a housing 84, and the mounting structure 80 is a clamp, such as a C-clamp, for coupling the housing 84 to the carrier 41. In other embodiments, the mounting structure 80 is a permanent magnet, which couples the removable sensor 74 to the metal or metal alloy of the carrier 41. In other embodiments, the mounting structure 80 is a mechanical fastener, which threadably engages a mounting bore defined in the carrier 41. In other embodiments, the mounting structure 80 is a bore, through which a mechanical fastener is received to couple the removable sensor 74 to the carrier 41. Alternatively, the mounting structure 80 may comprise a hook and loop fastener, which engages with a corresponding hook and loop fastener coupled to the carrier 41. Generally, it should be understood that the mounting structure 80 is any device or arrangement for removably coupling the removable sensor 74 to the carrier 41.

The sensor control module 82 receives the sensor signals from the sensor 76 and outputs the sensor signals via the sensor communication component 78 to the portable device 100. The sensor control module 82 may also output the sensor signals to the controller 48 via the sensor communication component 78. In certain embodiments, the sensor control module 82 may process the sensor signals from the sensor 76 to determine an angular position value, which is output, via the sensor communication component 78 to the portable device 100. In other embodiments, the portable device 100 processes the sensor signals to determine the angular position value. In this example, the angular position value is an angular position of the bucket 12 relative to the Earth's surface or ground.

It should be noted that while in this example, the removable sensor 74 communicates an angular position of the bucket 12 relative to the Earth's surface or ground to the portable device 100 for display, the present disclosure is not so limited. In this regard, any of the sensors 64-70 may be in communication with the portable device 100 over a suitable communication architecture for transmitting the one or more sensor signals for display on the portable device 100. The various components noted above (or others) may be utilized to control movement of the bucket 12 via control of the movement of the one or more hydraulic cylinders 28, 34, 36. Each of the sensors 64-70, 74 may be in communication with the controller 48 via a suitable communication architecture.

In various embodiments, the portable device 100 is in communication with the removable sensor 74 to receive the data from the sensor communication component 78. The portable device 100 is any suitable electronic device external to, separate from or discrete from the loader 10, including, but not limited to, a hand-held portable electronic device, such as a tablet computing device, mobile or smart phone, personal digital assistant, a laptop computing device, a smart watch, etc.

The portable device 100 includes a device communication component 102, a device user interface 104 and a device controller or control module 106. The device communication component 102 comprises any suitable system for receiving data from the sensor communication component 78. For example, the device communication component 102 may include a radio configured to receive data transmitted by modulating a radio frequency (RF) signal from a remote station (not shown) as is well known to those skilled in the art. For example, the remote station (not shown) may be part of a cellular telephone network and the data may be transmitted according to the long-term evolution (LTE) standard. The device communication component 102 also transmits data to the remote station (not shown) to achieve bi-directional communications. However, other techniques for transmitting and receiving data may alternately be utilized. For example, the device communication component 102 may achieve bi-directional communications with the sensor communication component 78 over Bluetooth or by utilizing a Wi-Fi standard, i.e., one or more of the 802.11 standards as defined by the Institute of Electrical and Electronics Engineers ("IEEE"), as is well known to those skilled in the art.

The device communication component 102 may also be configured to encode data or generate encoded data. The encoded data generated by the device communication component 102 may be encrypted. A security key may be utilized to decrypt and decode the encoded data, as is appreciated by those skilled in the art. The security key may be a "password" or other arrangement of data that permits the encoded data to be decrypted.

It will be understood that other configurations may also be possible. For example, in certain embodiments, portable device 100 may be coupled directly to the loader 10 via a docking station disposed within the cab 58 of the loader 10. The docking station may be in wired or wireless communication with the removable sensor 74 to enable the sensor signals from the sensor 76 to be transmitted over a communication architecture, such as a CAN bus, to the device control module 106. Thus, the docking station may comprise a suitable interface, such as USB, microUSB, Apple®

Lightning™, etc. that cooperates with an interface associated with the portable device 100 to enable data transfer to the portable device 100.

The device user interface 104 allows the user of the portable device 100 to interface with the portable device 100. In one example, the device user interface 104 includes a user input device 108 and a display 110. The user input device 108 is any suitable device capable of receiving user input, including, but not limited to, a keyboard, a microphone, a touchscreen layer associated with the display 110, or other suitable device to receive data and/or commands from the user. Of course, multiple user input devices 108 may also be utilized. The display 110 comprises any suitable technology for displaying information, including, but not limited to, a liquid crystal display (LCD), organic light emitting diode (OLED), plasma, or a cathode ray tube (CRT).

In certain embodiments, the device user interface 104 also includes an audio device 112. The audio device 112 is an audio output device, such as a speaker. In one example, the audio device 112 is responsive to one or more control signals from the device control module 106 to output an audible tone, such as a "beep."

In various embodiments, the device control module 106 outputs user interface data or interface that indicates the angular position value and a condition of the bucket 12 of the loader 10 for display on the display 110 associated with the portable device 100 based on one or more of the sensor signals received from the removable sensor 74, and input received from the user input device 108, and further based on the remote angular position display system and method of the present disclosure. The device control module 106 outputs audio data for the audio device 112 based on one or more of the sensor signals received from the removable sensor 74, and input received from the user input device 108, and further based on the remote angular position display system and method of the present disclosure. The device control module 106 also outputs calibration user interface data for display on the display 110 associated with the portable device 100 based on input received from the user input device 108, and further based on the remote angular position display system and method of the present disclosure.

The device control module 106 is in communication with the device communication component 102 and the device user interface 104 over a suitable interconnection architecture or arrangement that facilitates transfer of data, commands, power, etc. The device control module 106 receives input from the device user interface 104 and sets data, such as a calibration routine, for display on the display 110 based on the input from the device user interface 104. The device control module 106 also receives data, such as sensor data from the removable sensor 74, via the device communication component 102 and sets the angular position value determined from this data as output for display on the display 110 of the device user interface 104. The device control module 106 also determines, from the received sensor data, the condition associated with the bucket 12 of the loader 10, and outputs this condition for display on the display 110 of the device user interface 104. In this example, the conditions determined are a level condition in which the bucket 12 is in the first, level position; a roll back condition in which the bucket 12 is in the second, roll back position; and a dump condition in which the bucket 12 is in the third, dump position.

Figure 4:
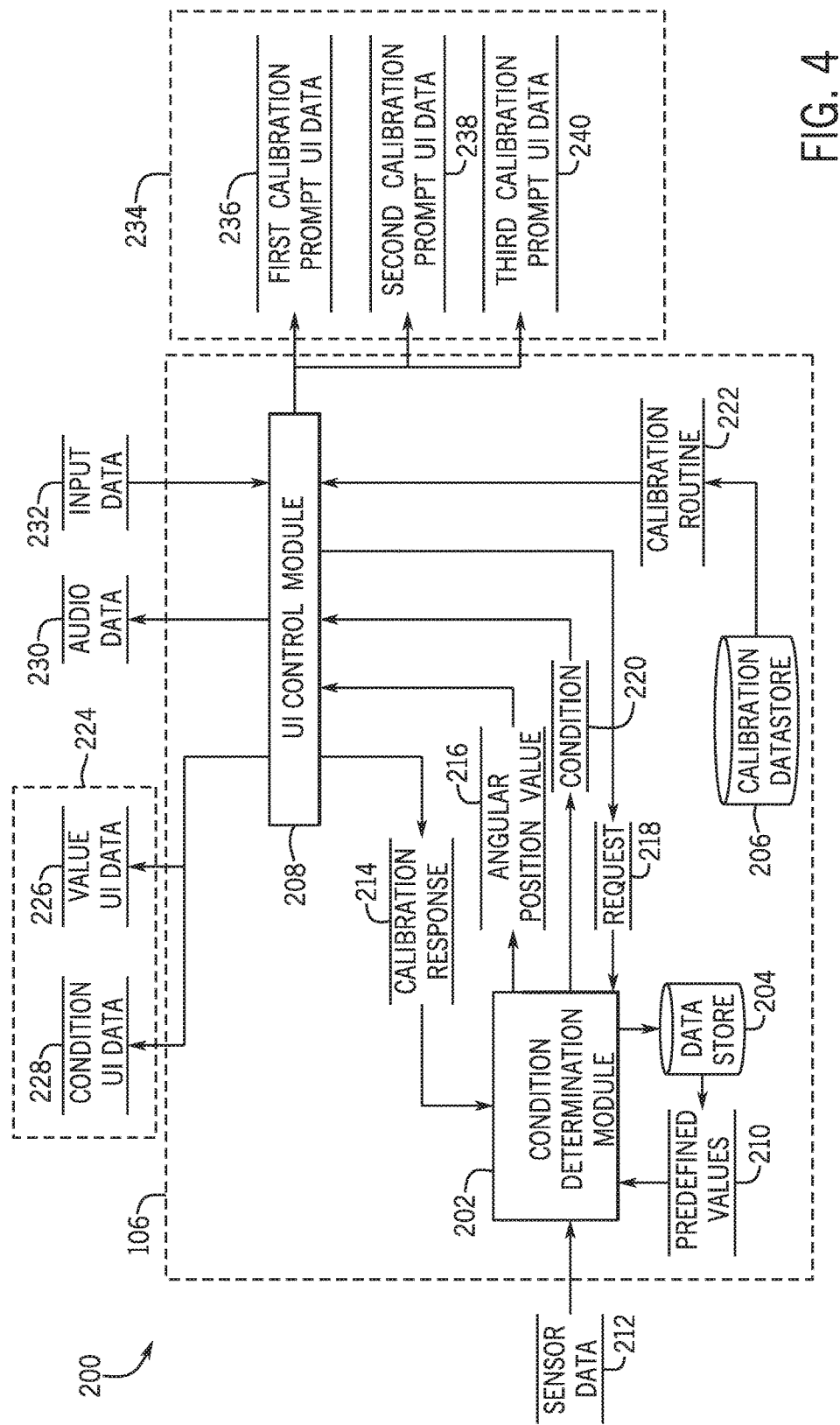
FIG. 4 is a dataflow diagram illustrating an example remote angular position display system in accordance with various embodiments.

Referring now also to FIG. 4, a dataflow diagram illustrates various embodiments of a remote angular position display system 200 for the loader 10, which may be embedded within the device control module 106. Various embodiments of the remote angular position display system 200 according to the present disclosure can include any number of sub-modules embedded within the device control module 106. As can be appreciated, the sub-modules shown in FIG. 4 can be combined and/or further partitioned to similarly output an interface that indicates the angular position value and the condition for display on the display 110, to output the audio data for the audio device 112 and to output a calibration user interface for display on the display 110 for calibrating the remote angular position display system 200. Inputs to the remote angular position display system 200 are received from the removable sensor 74 (FIG. 3), received from the device user interface 104 (FIG. 3), received from other control modules (not shown) associated with the loader 10, and/or determined/modeled by other sub-modules (not shown) within the device control module 106. In various embodiments, the device control module 106 includes a condition determination module 202, a datastore 204, a calibration datastore 206 and a user interface (UI) control module 208.

The datastore 204 stores predefined values 210. The predefined values 210 are sensor data 212 that is stored based on a calibration response 214 received from the UI control module 208. In this example, the predefined values 210 comprise user defined or user selected angular positions for the carrier 41 in each of the first, level position, the second, roll back position and third, dump position for the bucket 12. Thus, the predefined values 210 include a first predefined value that is the user selected angular position for the carrier 41 when the bucket 12 is in the first, level position based on the sensor data 212 associated with the received calibration response 214; a second predefined value that that indicates the user selected angular position for the carrier 41 when the bucket 12 is in the second, roll back position based on the sensor data 212 associated with the received calibration response 214; and a third predefined value that indicates the user selected angular position for the carrier 41 when the bucket 12 is in the third, dump position based on the sensor data 212 associated with the received calibration response 214.

The condition determination module 202 receives as input the sensor data 212. The sensor data 212 is the sensor signals received from the removable sensor 74 via the device communication component 102. The condition determination module 202 processes the sensor signals in the sensor data 212 to determine an angular position value 216. The angular position value 216 is the angular position of the carrier 41 as observed by the removable sensor 74. In certain instances, the angular position value 216 is the raw sensor signals received from the removable sensor 74. The condition determination module 202 sets the angular position value 216 for the UI control module 208.

The condition determination module 202 also receives as input a request 218 from the UI control module 208. The request 218 is a request to calibrate the remote angular position display system 200. Based on the receipt of the request 218, the condition determination module 202 awaits the calibration response 214 from the UI control module 208. The calibration response 214 is a user response to a particular calibration prompt output by the UI control module 208, which is received as input to the input device 108. For example, the calibration response 214 is a user response to a first calibration prompt to move the bucket 12 to the first, level position; a user response to a second calibration prompt to move the bucket 12 to the second, roll back position; and a user response to a third calibration prompt to move the bucket 12 to the third, dump position. Based on the receipt of the calibration response 214, the condition determination module 202 receives and processes the sensor data 212 to determine the angular position value 216. The condition determination module 202 associates the angular position value 216 with the calibration prompt for which the calibration response 214 was received, and stores this as the predefined value 210 for the user selected angular position of the carrier 41 in the particular position (e.g. level, roll back, dump) of the bucket 12.

For example, the condition determination module 202 receives the calibration response 214 associated with the first calibration prompt that indicates that the user has positioned the bucket 12 in the first, level position, and the condition determination module 202 receives and processes the sensor data 212 to determine the angular position value 216. The condition determination module 202 stores this angular position value 216 as the predefined value 210 in the datastore 204 for the angular position for the carrier 41 of the bucket 12 when the bucket 12 is in the first, level position. The condition determination module 202 receives the calibration response 214 associated with the second calibration prompt that indicates that the user has positioned the bucket 12 in the second, roll back position, and the condition determination module 202 receives and processes the sensor data 212 to determine the angular position value 216. The condition determination module 202 stores this angular position value 216 as the predefined value 210 in the datastore 204 for the angular position for the carrier 41 of the bucket 12 when the bucket 12 is in the second, roll back position. The condition determination module 202 receives the calibration response 214 associated with the third calibration prompt that indicates that the user has positioned the bucket 12 in the third, dump position, and the condition determination module 202 receives and processes the sensor data 212 to determine the angular position value 216. The condition determination module 202 stores this angular position value 216 as the predefined value 210 in the datastore 204 for the angular position for the carrier 41 of the bucket 12 when the bucket 12 is in the third, dump position.

Based on the angular position value 216 determined from the sensor data 212, the condition determination module 202 also retrieves the predefined values 210 from the datastore 204. The condition determination module 202 compares the determined angular position value 216 to each of the predefined values 210. Based on the comparison, the condition determination module 202 sets a condition 220 for the UI control module 208. The condition 220 is one of a level condition, a roll back condition or a dump condition.

In one example, based on the angular position value 216, the condition determination module 202 retrieves the predefined values 210 from the datastore 204. The condition determination module 202 compares the angular position value 216 to the first predefined value 210 (associated with the first, level position), the second predefined value 210 (associated with the second, roll back position) and the third predefined value 210 (associated with the third, dump position). If the angular position value 216 is between the first predefined value 210 and the second predefined value 210, the condition determination module 202 sets the condition 220 as the roll back condition. If the angular position value 216 is at the first predefined value, the condition determination module 202 sets the condition 220 as the level condition. Otherwise, if the angular position value 216 is between the first predefined value 210 and the third pre-defined value 210, the condition determination module 202 sets the condition 220 as the dump condition.

The calibration datastore 206 stores a calibration routine 222 for the UI control module 208. In one example, the calibration datastore 206 stores a calibration routine for the loader 10 and the calibration routine 222 includes one or more calibration prompts for outputting by the UI control module 208 for display on the display 110. In one example, the calibration routine 222 includes at least a first calibration prompt, a second calibration prompt and a third calibration prompt. In this example, the first calibration prompt instructs the user to move the bucket 12 to the first, level position and to provide user input once the bucket 12 is in the first, level position. The second calibration prompt instructs the user to move the bucket 12 to the second, roll back position and to provide user input once the bucket 12 is in the second, roll back position. The third calibration prompt instructs the user to move the bucket 12 to the third, dump position and to provide input once the bucket 12 is in the third, dump position.

The user interface (UI) control module 208 receives as input the angular position value 216 and the condition 220. Based on the angular position value 216 and the condition 220, the UI control module 208 outputs an interface 224. The interface 224 includes value user interface data 226 and condition user interface data 228. The value user interface data 226 is data that includes instructions for rendering a numerical representation of the angular position value 216 on the display 110. The condition user interface data 228 is data that includes instructions for rendering a textual representation of the condition 220 and also include instructions for rendering a graphical representation of the condition 220 on the display 110. In one example, the graphical representation is a graphical representation of the implement, which in this example, is the bucket 12.

Figure 5:
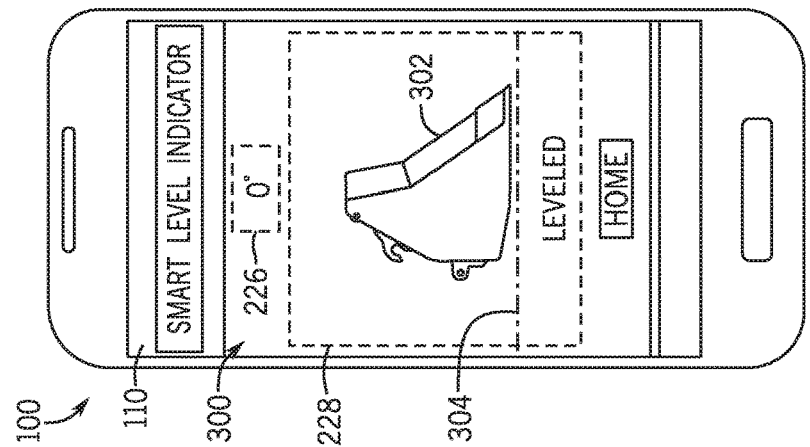

For example, with reference to FIG. 5, an exemplary interface 300, which is output by the UI control module 208 for display on the display 110 based on the angular position value 216 and the condition 220, is shown. In this example, the angular position value 216 is zero degrees and the condition 220 is the first, level condition. Thus, the instructions in the value user interface data 226 render the angular position value 216 of "0°" on the display 110. The rendered value may also be displayed in the display 110 in a particular color associated with the angular position value 216, if desired. The instructions in the condition user interface data 228 render the condition 220 of "Leveled" in text on the display 110. The instructions in the condition user interface data 228 also render the condition 220 of the first, level position in a graphical representation of a bucket 302 at a level position relative to a ground line 304 on the display 110. The rendered bucket 302 may also be displayed in the display 110 with a fill or shading of a particular color associated with the condition 220, if desired. For example, in the first, level condition the bucket 302 may be green.

Figure 6:
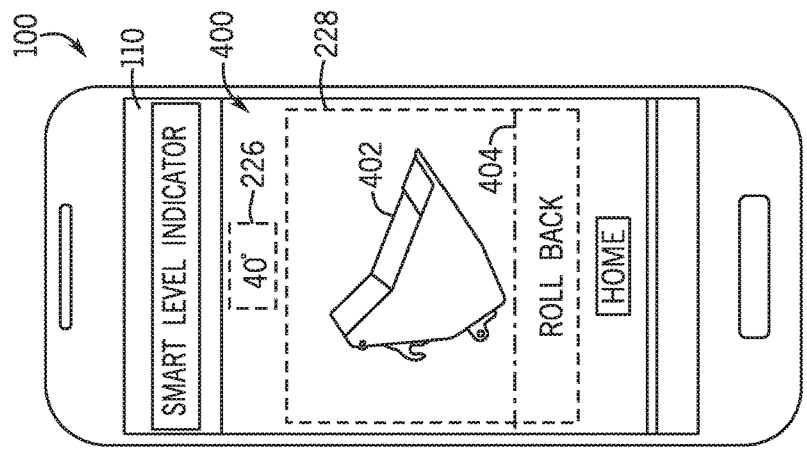

In one example, with reference to FIG. 6, an exemplary interface 400, which is output by the UI control module 208 for display on the display 110 based on the angular position value 216 and the condition 220, is shown. In this example, the angular position value 216 is positive 40 degrees and the condition 220 is the second, roll back condition. Thus, the instructions in the value user interface data 226 render the angular position value 216 of "40°" on the display 110. The rendered value may also be displayed in the display 110 in a particular color associated with the angular position value 216, if desired. The instructions in the condition user interface data 228 render the condition 220 of "Roll back" in text on the display 110. The instructions in the condition user interface data 228 also render the condition 220 of the second, roll back position in a graphical representation of a bucket 402 at a roll back position relative to a ground line 404 on the display 110. The rendered bucket 402 may also be displayed in the display 110 with a fill or shading of a particular color associated with the second, roll back condition, if desired. For example, in the second, roll back condition the bucket 402 may be blue.

Figure 7:
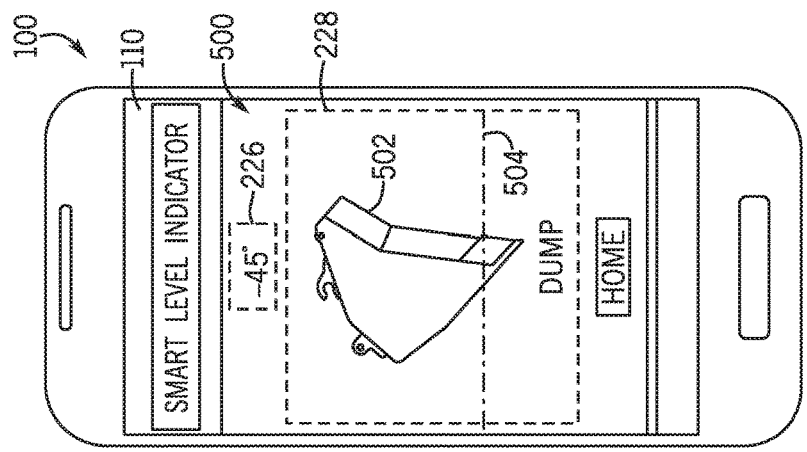
FIGS. 5-7 are example interfaces output for display on the display of the portable device, which indicate an angular position observed by the sensor and a condition of the bucket of the work vehicle according to various embodiments.

In one example, with reference to FIG. 7, an exemplary interface 400, which is output by the UI control module 208 for display on the display 110 based on the angular position value 216 and the condition 220, is shown. In this example, the angular position value 216 is negative 45 degrees and the condition 220 is the third, dump condition. Thus, the instructions in the value user interface data 226 render the angular position value 216 of "−45°" on the display 110. The rendered value may also be displayed in the display 110 in a particular color associated with the angular position value 216, if desired. In this example, the instructions of the value user interface data 226 render the angular position value 216 on the display 110 in red. The instructions in the condition user interface data 228 render the condition 220 of "Dump" in text on the display 110. The instructions in the condition user interface data 228 also render the condition 220 of the third, dump position in a graphical representation of a bucket 502 at a dump position relative to a ground line 504 on the display 110. The rendered bucket 502 may also be displayed in the display 110 with a fill or shading of a particular color associated with the third, dump condition, if desired. For example, in the third, dump back condition the bucket 502 may be yellow.

With reference again to FIG. 4, based on the receipt of the angular position value 216 and the condition 220, the UI control module 208 also outputs audio data 230. The audio data 230 is one or more control signals to the audio device 112. In one example, the audio data 230 is one of more control signals to the audio device 112 to output a tone, such as a "beep."

The UI control module 208 also receives input data 232. The input data 232 is input received via the user's interaction with the user input device 108. The UI control module 208 interprets the input data 232, and determines whether a request to calibrate the remote angular position display system 200 has been received. Based on the determination that the request has been received to calibrate the remote angular position display system 200, the UI control module 208 sets the request 218 for the condition determination module 202.

Based on the determination that the request has been received to calibrate the remote angular position display system 200, the UI control module 208 also retrieves the calibration routine 222 from the calibration datastore 206. Based on the retrieved calibration routine 222, the UI control module 208 outputs calibration interface 234. In this example, the calibration interface 234 includes first calibration prompt user interface data 236, second calibration prompt user interface data 238 and third calibration prompt user interface data 240. The first calibration prompt user interface data 236 is instructions for rendering the first calibration prompt on the display 110 and for the user to provide input to the user input device 108 upon completion. The second calibration prompt user interface data 238 is instructions for rendering the second calibration prompt on the display 110 and for the user to provide input to the user input device 108 upon completion. The third calibration prompt user interface data 240 is instructions for rendering the third calibration prompt on the display 110 and for the user to provide input to the user input device 108 upon completion.

Figure 8:
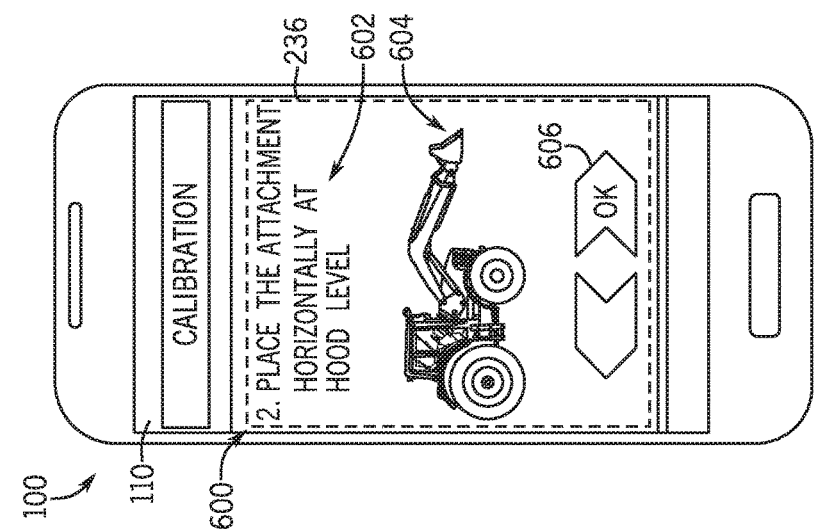

For example, with reference to FIG. 8, an exemplary calibration interface 600 is shown. The calibration interface 600 in this example includes the first calibration prompt user interface data 236, which is output by the UI control module 208 for rendering on the display 110 based on the retrieved calibration routine 222. The first calibration prompt user interface data 236 rendered on the display 110 includes an instructional prompt 602, a graphical representation 604 and at least one button 606 for user input. In this example, the instructional prompt 602 is a textual message that instructs the user how to move the bucket 12 to the first, level position. The graphical representation 604 includes an image of the loader 10 and the bucket 12, with the bucket 12 positioned in the first, level position to graphically indicate the desired position for the bucket 12 to arrive at the first, level position. The at least one button 606 receives user input to indicate that the first calibration prompt has been completed.

Figure 9:
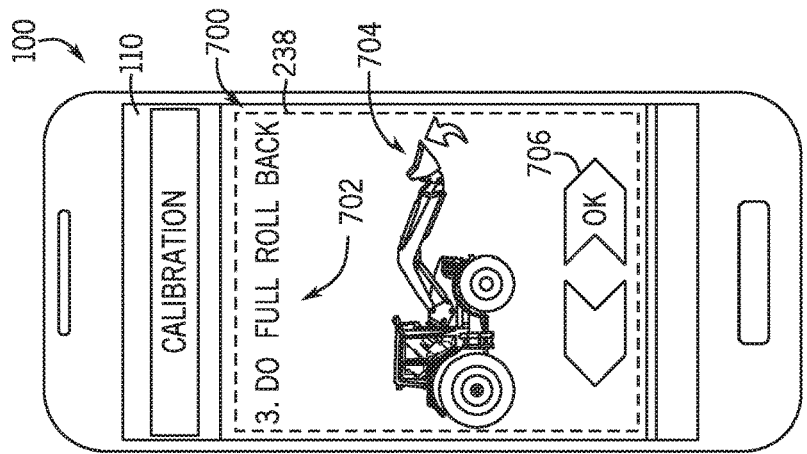

In one example, with reference to FIG. 9, an exemplary calibration interface 700 is shown. The calibration interface 700 in this example includes the second calibration prompt user interface data 238, which is output by the UI control module 208 for rendering on the display 110 based on the retrieved calibration routine 222. The second calibration prompt user interface data 238 rendered on the display 110 includes an instructional prompt 702, a graphical representation 704 and at least one button 706 for user input. In this example, the instructional prompt 702 is a textual message that instructs the user how to move the bucket 12 to the second, roll back position. The graphical representation 704 includes an image of the loader 10 and the bucket 12, with the bucket 12 positioned in the second, roll back position to graphically indicate the desired position for the bucket 12 to arrive at the second, roll back position. The at least one button 706 receives user input to indicate that the second calibration prompt has been completed.

Figure 10:
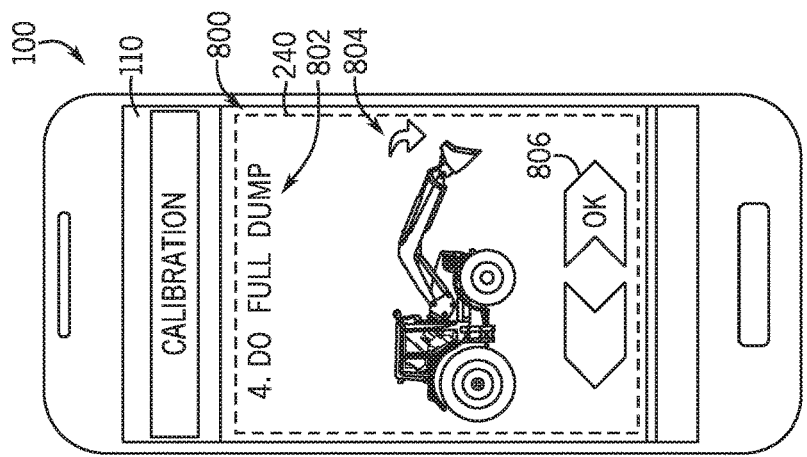
FIGS. 8-10 are example calibration interfaces output for display on the display of the portable device, which include calibration prompts according to various embodiments.

In one example, with reference to FIG. 10, an exemplary calibration interface 800 is shown. The calibration interface 800 in this example includes the third calibration prompt user interface data 240, which is output by the UI control module 208 for rendering on the display 110 based on the retrieved calibration routine 222. The third calibration prompt user interface data 240 rendered on the display 110 includes an instructional prompt 802, a graphical representation 804 and at least one button 806 for user input. In this example, the instructional prompt 802 is a textual message that instructs the user how to move the bucket 12 to the third, dump position. The graphical representation 804 includes an image of the loader 10 and the bucket 12, with the bucket 12 positioned in the third, dump position to graphically indicate the desired position for the bucket 12 to arrive at the third, dump position. The at least one button 806 receives user input to indicate that the third calibration prompt has been completed.

With reference back to FIG. 4, the UI control module 208 also interprets the input data 232 to determine whether the calibration response 214 has been received. In this regard, based on the first calibration prompt user interface data 236 rendered on the display 110, the UI control module 208 interprets the input data 232 to determine whether the at least one button 606 has been depressed. If true, the UI control module 208 sets the calibration response 214 that indicates that the user has positioned the bucket 12 in the first, level position. Based on the second calibration prompt user interface data 238 rendered on the display 110, the UI control module 208 also interprets the input data 232 to determine whether the at least one button 706 has been depressed. If true, the UI control module 208 sets the calibration response 214 that indicates that the user has positioned the bucket 12 in the second, roll back position. Based on the third calibration prompt user interface data 240 rendered on the display 110, the UI control module 208 interprets the input data 232 to determine whether the at least one button 806 has been depressed. If true, the UI control module 208 sets the calibration response 214 that indicates that the user has positioned the bucket 12 in the third, dump position.

Figure 11:
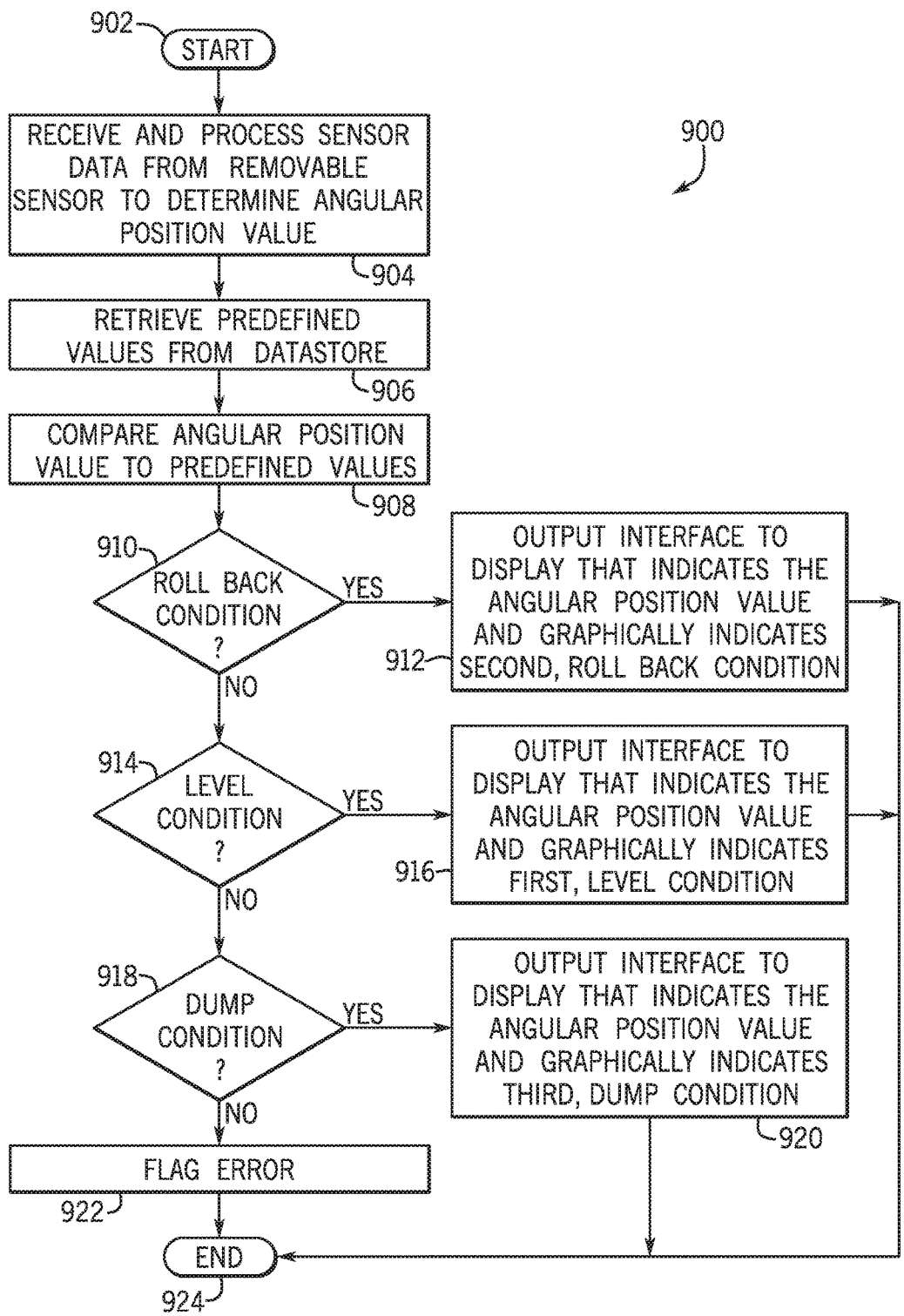
FIG. 11 is a flowchart illustrating an example method of the remote angular position display system of FIG. 1 in accordance with various embodiments.

Referring now also to FIG. 11, a flowchart illustrates a method 900 that may be performed by the device control module 106 of FIGS. 1-4 in accordance with the present disclosure. As can be appreciated in light of the disclosure, the order of operation within the method is not limited to the sequential execution as illustrated in FIG. 11, but may be performed in one or more varying orders as applicable and in accordance with the present disclosure.

In various embodiments, the method may be scheduled to run based on predetermined events, and/or can run based on the receipt of the sensor data 212.

In one example, with reference to FIG. 11, the method begins at 902. At 904, the method receives and processes the sensor data 212 received from the removable sensor 74 to determine the angular position value 216. At 906, based on the angular position value 216 determined at 902, the method retrieves the predefined values 210 from the datastore 204. At 908, the method compares the angular position value 216 to the predefined values 210.

Based on the comparison between the angular position value 216 and the predefined values 210, the method determines the condition 220. At 910, the method determines whether the condition 220 is the second, roll back condition based on the comparison between the angular position value 216, the first predefined value 210 and the second predefined value 210. If true, the method proceeds to 912. Otherwise, at 914, the method determines whether the condition 220 is the first, level condition based on the comparison between the angular position value 216 and the first predefined value 210. If true, the method proceeds to 916. Otherwise, at 918, the method determines whether the condition 220 is the third, dump condition based on the comparison between the angular position value 216, the first predefined value 210 and the third predefined value 210. If true, the method proceeds to 920. Otherwise, the method flags an error at 922 and ends at 924.

At 912, the method outputs the interface 224 to the display 110, which includes the value user interface data 226 associated with the angular position value 216 and the condition user interface data 228 associated with the condition 220 of the second, roll back condition. The method ends at 924.

At 916, the method outputs the interface 224 to the display 110, which includes the value user interface data 226 associated with the angular position value 216 and the condition user interface data 228 associated with the condition 220 of the first, level condition. The method ends at 924.

At 920, the method outputs the interface 224 to the display 110, which includes the value user interface data 226 associated with the angular position value 216 and the condition user interface data 228 associated with the condition 220 of the third, dump condition. The method ends at 924.

Figure 12:
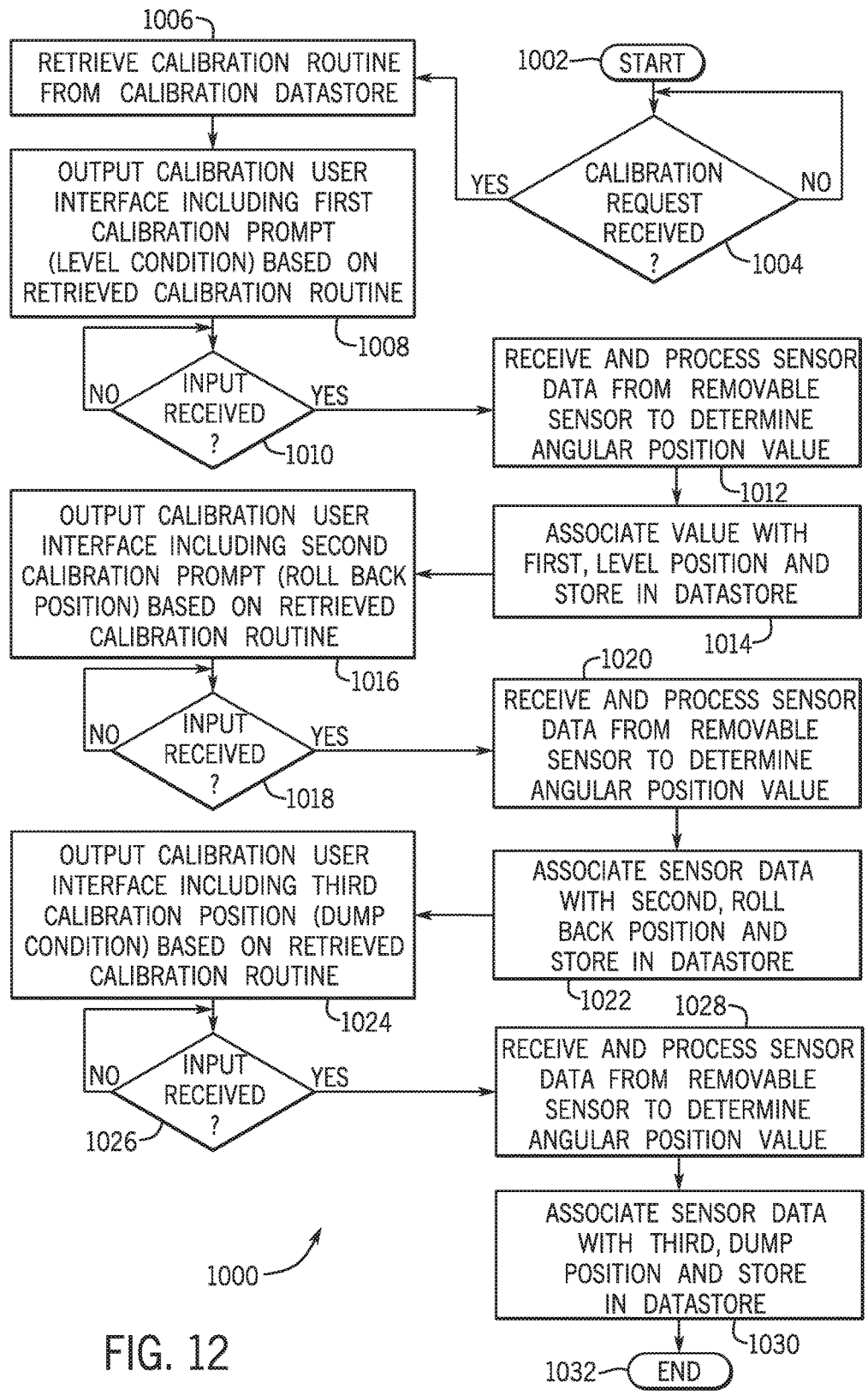
FIG. 12 is a flowchart illustrating an example calibration method of the remote angular position display system of FIG. 1 in accordance with various embodiments.

Referring now also to FIG. 12, a flowchart illustrates a calibration method 1000 that may be performed by the device control module 106 of FIGS. 1-4 in accordance with the present disclosure. As can be appreciated in light of the disclosure, the order of operation within the method is not limited to the sequential execution as illustrated in FIG. 12, but may be performed in one or more varying orders as applicable and in accordance with the present disclosure.

In various embodiments, the calibration method may be scheduled to run based on predetermined events, and/or can run based on the receipt of the input data 232.

In one example, with reference to FIG. 11, the method begins at 1002. At 1004, the method determines, based on the input data 232, whether a request to calibrate the remote angular position display system 200 has been received. If true, the method proceeds to 1006. Otherwise, the method loops.

At 1006, the method retrieves the calibration routine 222 from the calibration datastore 206. At 1008, based on the retrieved calibration routine 222, the method outputs the calibration interface 234, which includes the first calibration prompt user interface data 236 to the display 110. At 1010, the method determines whether the input data 232 has been received, which indicates that the first calibration prompt has been completed by the user (e.g. the method determines whether input has been received to the at least one button 606 (FIG. 8)). If true, the method proceeds to 1012. Otherwise, the method loops.

At 1012, the method receives and processes the sensor data 212 from the removable sensor 74 to determine the angular position value 216. At 1014, the method associates the angular position value 216 with the first, level position and stores the angular position value 216 as the first predefined value 210 in the datastore 204. At 1016, based on the retrieved calibration routine 222, the method outputs the calibration interface 234, which includes the second calibration prompt user interface data 238 to the display 110. At 1018, the method determines whether the input data 232 has been received, which indicates that the second calibration prompt has been completed by the user (e.g. the method determines whether input has been received to the at least one button 706 (FIG. 9)). If true, the method proceeds to 1020. Otherwise, the method loops.

At 1020, the method receives and processes the sensor data 212 from the removable sensor 74 to determine the angular position value 216. At 1022, the method associates the angular position value 216 with the second, roll back position and stores the angular position value 216 as the second predefined value 210 in the datastore 204. At 1024, based on the retrieved calibration routine 222, the method outputs the calibration interface 234, which includes the third calibration prompt user interface data 240 to the display 110. At 1026, the method determines whether the input data 232 has been received, which indicates that the third calibration prompt has been completed by the user (e.g. the method determines whether input has been received to the at least one button 806 (FIG. 10)). If true, the method proceeds to 1028. Otherwise, the method loops.

At 1028, the method receives and processes the sensor data 212 from the removable sensor 74 to determine the angular position value 216. At 1030, the method associates the angular position value 216 with the third, dump position and stores the angular position value 216 as the third predefined value 210 in the datastore 204. The method ends at 1032.

As will be appreciated by one skilled in the art, certain aspects of the disclosed subject matter can be embodied as a method, system (e.g., a work vehicle control system included in a work vehicle), or computer program product. Accordingly, certain embodiments can be implemented entirely as hardware, entirely as software (including firmware, resident software, micro-code, etc.) or as a combination of software and hardware (and other) aspects. Furthermore, certain embodiments can take the form of a computer program product on a computer-usable storage medium having computer-usable program code embodied in the medium.

Any suitable computer usable or computer readable medium can be utilized. The computer usable medium can be a computer readable signal medium or a computer readable storage medium. A computer-usable, or computer-readable, storage medium (including a storage device associated with a computing device or client electronic device) can be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium can be any tangible medium that can contain, or store a program for use by or in connection with the instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be non-transitory and can be any computer readable medium that is not a computer readable storage medium and that can communicate, propagate, or transport a program for use by or in connection with an instruction execution system, apparatus, or device.

Aspects of certain embodiments are described herein can be described with reference to flowchart illustrations and/or block diagrams of methods, apparatus (systems) and computer program products according to embodiments of the disclosure. It will be understood that each block of any such flowchart illustrations and/or block diagrams, and combinations of blocks in such flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any flowchart and block diagrams in the figures, or similar discussion above, can illustrate the architecture, functionality, and operation of possible implementations of systems, methods and computer program products according to various embodiments of the present disclosure. In this regard, each block in the flowchart or block diagrams can represent a module, segment, or portion of code, which includes one or more executable instructions for implementing the specified logical function(s). It should also be noted that, in some alternative implementations, the functions noted in the block (or otherwise described herein) can occur out of the order noted in the figures. For example, two blocks shown in succession (or two operations described in succession) can, in fact, be executed substantially concurrently, or the blocks (or operations) can sometimes be executed in the reverse order, depending upon the functionality involved. It will also be noted that each block of any block diagram and/or flowchart illustration, and combinations of blocks in any block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A method for displaying an angular position of a work implement of a work vehicle on a display associated with a portable device, the angular position observed by a sensor that is coupled one of the work implement and the work vehicle, the method comprising:

receiving, by a processor of the portable device, one or more signals from the sensor indicative of an angular position value;

determining, by the processor, a condition associated with the work implement based on the angular position value, including:
retrieving, by the processor, at least one predefined value associated with the work implement from a datastore;
receiving, from an input device associated with the portable device, at least one user input associated with at least one calibration prompt that indicates that the at least one calibration prompt has been completed by the user to move the work implement to at least one position;
based on the at least one user input, associating the angular position value with the at least one position and storing the angular position value as the at least one predefined value in the datastore; and
comparing, by the processor, the angular position value and the at least one predefined value; and
outputting, by the processor, an interface for rendering on the display associated with the portable device that indicates the angular position value and the determined condition associated with the work implement of the work vehicle.

2. The method of claim 1, wherein the sensor is a gyroscope that observes the angular position of a carrier of the work implement and the method further comprises:
communicating the angular position value from the gyroscope to the processor of the portable device.

3. The method of claim 1, wherein the sensor is an inertial measurement unit that observes the angular position of a carrier of the work implement and the method further comprises:
communicating the angular position value from the inertial measurement unit to the processor of the portable device.

4. The method of claim 1, wherein the at least one predefined value comprises a first predefined value, a second predefined value and a third predefined value;
wherein the at least one user input includes a first user input, a second user input and a third user input;
wherein the receiving, from the input device associated with the portable device, includes:
a first user input associated with a first calibration prompt that indicates that the first calibration prompt has been completed by the user to move the work implement to a first position, a second user input associated with a second calibration prompt that indicates that the second calibration prompt has been completed by the user to move the work implement to a second position and a third user input associated with a third calibration prompt that indicates that the third calibration prompt has been completed by the user to move the work implement to a third position; and
wherein the associating the angular position value with the at least one position and storing the angular position value as the at least one predefined value in the datastore, includes:
based on the first user input, associating the angular position value with the first position and storing the angular position value as the first predefined value in the datastore;
based on the second user input, associating the angular position value with the second position and storing the angular position value as the second predefined value in the datastore; and
based on the third user input, associating the angular position value with the third position and storing the angular position value as the third predefined value in the datastore.

5. The method of claim 4, wherein the method further comprises:
comparing the angular position value to each of the first predefined value, the second predefined value and the third predefined value to determine the condition.

6. The method of claim 5, wherein the work vehicle is a loader, the first predefined value is an angular position value for a dump condition, the second predefined value is an angular position value for a level condition and the third predefined value is an angular position value for a rollback condition, and the method further comprises:
determining, by the processor, the dump condition based on the angular position value as between the first predefined value and the second predefined value;
determining, by the processor, the level condition based on the angular position value as the second predefined value; and
determining, by the processor, the roll back condition based on the angular position value as between the second predefined value and the third predefined value.

7. A system for displaying an angular position of a work implement of a work vehicle on a display associated with a portable device, the angular position observed by a sensor that is coupled to one of the work implement and the work vehicle, the system comprising:
a source of an angular position value observed by the sensor; and
a processor of the portable device that:
retrieves a first predefined value, a second predefined value and a third predefined value from a datastore, each of the first predefined value, the second predefined value and the third predefined value being associated with the work implement;
receives, from an input device associated with the portable device, a first user input associated with a first calibration prompt that indicates that the first calibration prompt has been completed by the user to move the work implement to a first position;
receives, from an input device associated with the portable device, a second user input associated with a second calibration prompt that indicates that the second calibration prompt has been completed by the user to move the work implement to a second position;
receives, from an input device associated with the portable device, a third user input associated with a third calibration prompt that indicates that the third calibration prompt has been completed by the user to move the work implement to a third position;
stores the angular position value as the first predefined value, the second predefined value or the third predefined value based on the received one of the first user input, the second user input and the third user input;
compares the angular position value and the at least one predefined value to determine the condition associated with the work implement;
and
outputs an interface for rendering on the display associated with the portable device that indicates the angular position value and the determined condition associated with the work implement of the work vehicle.

8. The system of claim 7, wherein the source is the sensor, which is removably coupled to a carrier of the work vehicle, and the sensor is in communication with the processor of the portable device to communicate the angular position value to the processor of the portable device.

9. The system of claim 7, wherein the sensor is a gyroscope that observes the angular position of the carrier of the work implement.

10. The system of claim 7, wherein the sensor is an inertial measurement unit that observes the angular position of the carrier of the work implement.

11. The system of claim 7, wherein the processor of the portable device:
based on the first user input, associates the angular position value with the first position and stores the angular position value as the first predefined value in the datastore;
based on the second user input, associates the angular position value with the second position and stores the angular position value as the second predefined value in the datastore; and
based on the third user input, associates the angular position value with the third position and stores the angular position value as the third predefined value in the datastore.

12. The system of claim 11, wherein the processor of the portable device compares the angular position value to each of the first predefined value, the second predefined value and the third predefined value to determine the condition.

13. The system of claim 12, wherein the work vehicle is a loader, the first predefined value is an angular position for a dump condition, the second predefined value is an angular position for a level condition and the third predefined value is an angular position for a rollback condition, and the processor of the portable device:
determines the dump condition based on the received value as between the first predefined value and the second predefined value;
determines the level condition based on the received value as the second predefined value; and
determines the rollback condition based on the received value as between the second predefined value and the third predefined value.

14. A system for displaying an angular position of a work implement of a work vehicle on a display associated with a portable device, the angular position observed by a sensor that is removably coupled to one of the work implement and the work vehicle, the system comprising:
the sensor that observes the work implement and generates one or more signals indicative of an angular position value based on the observation; and
a processor of the portable device that:
receives, from an input device associated with the portable device, a first user input associated with a first calibration prompt that indicates that the first calibration prompt has been completed by the user to move the work implement to a first position;
receives, from an input device associated with the portable device, a second user input associated with a second calibration prompt that indicates that the second calibration prompt has been completed by the user to move the work implement to a second position;
stores the angular position value as the first predefined value or the second predefined value on the received one of the first user input and the second user input;
retrieves at least a first predefined value and a second predefined value from a datastore, each of the first predefined value and the second predefined value being associated with the work implement;
compares the angular position value and the first predefined value to determine a first condition associated with the work implement;
compares the angular position value and the second predefined value to determine a second condition associated with the work implement; and
outputs an interface for rendering on the display associated with the portable device that indicates the angular position value and the determined one of the first condition or the second condition associated with the work implement of the work vehicle.

15. The system of claim 14, wherein the processor retrieves a third predefined value from the datastore, and the processor compares the angular position value and the third predefined value to determine a third condition associated with the work implement.

16. The system of claim 15, wherein the processor of the portable device:
receives, from an input device associated with the portable device, a third user input associated with a third calibration prompt that indicates that the third calibration prompt has been completed by the user to move the work implement to a third position; and
stores the angular position value as the third predefined value based on the received third user input.

17. The system of claim 16, wherein the work vehicle is a loader, the first predefined value is a first angular position, the first condition is a dump condition, the second predefined value is a second angular position, the second condition is a level condition, the third predefined value is a third angular position and the third condition is a rollback condition, and the processor of the portable device:
determines the dump condition based on the received value as between the first predefined value and the second predefined value;
determines the level condition based on the received value as the second predefined value; and
determines the rollback condition based on the received value as between the second predefined value and the third predefined value.

* * * * *

UNITED STATES PATENT AND TRADEMARK OFFICE
CERTIFICATE OF CORRECTION

| | | |
|---|---|---|
| PATENT NO. | : 10,407,879 B2 | Page 1 of 1 |
| APPLICATION NO. | : 15/427777 | |
| DATED | : September 10, 2019 | |
| INVENTOR(S) | : Gonzalez et al. | |

It is certified that error appears in the above-identified patent and that said Letters Patent is hereby corrected as shown below:

In the Claims

In Column 21, Claim 4, Line 44, delete "a first user" and insert -- the first user --, therefor.

Signed and Sealed this
Thirty-first Day of December, 2019

Andrei Iancu
*Director of the United States Patent and Trademark Office*